US011249904B2

United States Patent
Nakamoto et al.

(10) Patent No.: US 11,249,904 B2
(45) Date of Patent: Feb. 15, 2022

(54) INFORMATION PROCESSING SYSTEM AND INFORMATION PROCESSING METHOD TO BE EXECUTED BY INFORMATION PROCESSING SYSTEM

(71) Applicant: MITSUBISHI HEAVY INDUSTRIES MACHINERY SYSTEMS, LTD., Kobe (JP)

(72) Inventors: Hiromichi Nakamoto, Tokyo (JP); Naruhisa Kameo, Tokyo (JP); Hiroyuki Nakayama, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 0 days.

(21) Appl. No.: 16/763,652

(22) PCT Filed: Nov. 17, 2017

(86) PCT No.: PCT/JP2017/041548
§ 371 (c)(1),
(2) Date: May 13, 2020

(87) PCT Pub. No.: WO2019/097693
PCT Pub. Date: May 23, 2019

(65) Prior Publication Data
US 2020/0278928 A1   Sep. 3, 2020

(51) Int. Cl.
*G06F 12/00*   (2006.01)
*G06F 12/06*   (2006.01)

(52) U.S. Cl.
CPC .. *G06F 12/0638* (2013.01); *G06F 2212/1008* (2013.01)

(58) Field of Classification Search
CPC ............. G06F 12/0638; G06F 2212/1008
See application file for complete search history.

(56) References Cited

U.S. PATENT DOCUMENTS 4,675,813 A * 6/1987 Locke ................. G06F 12/0661
710/9
6,212,609 B1 * 4/2001 Abramson ............... G06F 1/30
711/102
(Continued)

FOREIGN PATENT DOCUMENTS

| JP | H06131241 A | * | 5/1994 | ............. G06F 12/00 |
| JP | 2015-156205 A | | 8/2015 | |

OTHER PUBLICATIONS

PCT/ISA/210, "International Search Report for International Application No. PCT/JP2017/041548," dated Jan. 16, 2018.
(Continued)

*Primary Examiner* — Shawn X Gu
*Assistant Examiner* — Mohammad S Hasan
(74) *Attorney, Agent, or Firm* — Manabu Kanesaka; Benjamin Hauptman; Kenneth Berner

(57) ABSTRACT

An information processing system includes a CPU that is configured to output an address and a writing instruction signal instructing to write data to the address or a reading instruction signal instructing to read data from the address, to a selector, the selector that is configured by hardware such that an output destination of data input from the CPU is determined according to the address, the writing instruction signal, and the reading instruction signal, a volatile memory that is configured to store data including snapshot image information and initial setting data for a non-standard device including a register when the information processing system is started, on the basis of a signal output from the selector, and the register that has the same address as an address of a memory region of the volatile memory storing the initial setting data.

4 Claims, 8 Drawing Sheets

(56) References Cited

U.S. PATENT DOCUMENTS

| | | | |
|---|---|---|---|
| 9,767,054 B2* | 9/2017 | Mori | G06F 13/28 |
| 2007/0220490 A1* | 9/2007 | Kobayashi | G06F 9/485 |
| | | | 717/124 |
| 2014/0365809 A1* | 12/2014 | Higeta | G01R 31/3172 |
| | | | 713/401 |
| 2015/0149997 A1* | 5/2015 | Tsirkin | G06F 9/45558 |
| | | | 718/1 |
| 2015/0205619 A1 | 7/2015 | Kato | |
| 2017/0168852 A1* | 6/2017 | Shen | G06F 9/4411 |
| 2018/0173548 A1* | 6/2018 | Schoenberg | G06F 9/45558 |

OTHER PUBLICATIONS

PCT/ISA/237, "Written Opinion of the International Searching Authority for International Application No. PCT/JP2017/041548," dated Jan. 16, 2018.

* cited by examiner

INFORMATION PROCESSING SYSTEM AND INFORMATION PROCESSING METHOD TO BE EXECUTED BY INFORMATION PROCESSING SYSTEM

RELATED APPLICATIONS

The present application is National Phase of International Application No. PCT/JP2017/041548 filed Nov. 17, 2017, the disclosure of which is hereby incorporated by reference herein in its entirety.

TECHNICAL FIELD

The present invention relates to an information processing system and an information processing method to be executed by the information processing system.

BACKGROUND ART

In various information processing systems such as a car navigation system and a game machine, there is a request for using an information processing system from a user right after a starting operation is performed on the information processing system. Thus, the information processing system may be desired to be immediately started in a predetermined state (for example, a factory default state, or a state right before a power source of an apparatus is turned off).

As a related technique, Patent Document 1 discloses a technique in which data indicating a storage state of a volatile memory, a register value of a peripheral device, and a register value of a processor before a system is stopped is stored in a nonvolatile memory, and an operating system (OS) immediately initializes the information processing system by reproducing a state before the system is stopped by using the data stored in the nonvolatile memory according to a kernel function at the time of starting the system.

CITATION LIST

Patent Literature

Patent Document 1

Japanese Unexamined Patent Application, First Publication No. 2015-156205

SUMMARY OF INVENTION

Technical Problem

Meanwhile, peripheral devices used in the information processing system include a peripheral device that is initialized to a state of being able to be immediately operated from a predetermined state after being started as a result of data including snapshot image information being written into a main memory when the information processing system is started, and a peripheral device that includes a register and is not initialized to an operational state after being started until an initial setting of the register is performed. The snapshot image information is information indicating a predetermined state such as a factory default state or a state right before a power source of an apparatus is turned off, and is information that is not to be lost even in a case where the information processing system is shut down because the information is stored in a nonvolatile memory. In a case where the information processing system is shut down and is then started, a value of a register of a peripheral device including the register is brought into a so-called undefined state. Therefore, the peripheral device including the register cannot be operated until initial setting data indicating initial setting is written into the register, that is, the peripheral device including the register is initialized. In other words, since the peripheral device including the register is not initialized, in the information processing system, the peripheral device including the register cannot be immediately used after the information processing system is started.

Thus, there is a demand for a technique of being able to immediately initialize a peripheral device including a register when an information processing system is started.

An object of the present invention is to provide an information processing system and an information processing method to be executed by the information processing system capable of solving the problem.

Solution to Problem

According to a first aspect of the present invention, there is provided an information processing system (1) including a CPU (20) that is configured to output an address and a writing instruction signal instructing to write data to the address or a reading instruction signal instructing to read data from the address, to a selector (70); the selector that is configured by hardware and configured to determine such that an output destination of data input from the CPU is determined according to the address, the writing instruction signal, and the reading instruction signal; a volatile memory (50) that is configured to store data including snapshot image information and initial setting data for a non-standard device (40) including a register when the information processing system is started, on the basis of a signal output from the selector; and the register (401) that has the same address as an address of a memory region of the volatile memory storing the initial setting data.

When the information processing system is started, the information processing system performs a process of writing the data including the snapshot image information and the initial setting data for the non-standard device including the register into a memory region corresponding to the same address of the volatile memory as an address of the register. In the above-described way, when the information processing system is started, the snapshot image information is reproduced in the volatile memory, and, simultaneously, the initial setting data is written into the register. Therefore, the snapshot image information is written into the volatile memory and thus a standard device is brought into an operational state, and, almost simultaneously, the non-standard device is brought into an operational state.

As described above, when the information processing system is started, the information processing system can immediately initialize a peripheral device including a register.

According to a second aspect of the present invention, in the information processing system of the first aspect, in a case where the same address that the volatile memory and the register have is input to the selector and the writing instruction signal is input to the selector, the selector outputs the same address to the volatile memory and the register and outputs write data to both of the volatile memory and the register.

The information processing system inputs the address and the write data to both of the volatile memory and the register. Thus, the information processing system writes the same write data into a memory region corresponding to the same address in each of the volatile memory and the register. In the above-described way, the information processing system can synchronize the volatile memory with the register in the memory regions corresponding to the same address.

According to a third aspect of the present invention, in the information processing system of the first aspect or the second aspect, in a case where the same address that the volatile memory and the register have is input to the selector and the reading instruction signal is input to the selector, the selector outputs the same address to the register, acquires read data from the register, and outputs the writing instruction signal and the read data acquired from the register to the volatile memory.

In a case where data is read from an address common to both of the volatile memory and the register, the information processing system acquires write data from the register. The information processing system writes read data into a memory region of the volatile memory corresponding to the same address as an address correlated with the read data acquired from the register. In the above-described way, the information processing system can synchronize the volatile memory with the register in the memory regions corresponding to the same address.

According to a fourth aspect of the present invention, in the information processing system of the first aspect or the second aspect, in a case where the same address that the volatile memory and the register have is input to the selector, and the reading instruction signal is input to the selector, the selector outputs the same address to the memory, acquires read data from the memory, and outputs the writing instruction signal and the read data acquired from the memory to the register.

In a case where data is read from an address common to both of the volatile memory and the register, the information processing system acquires write data from the volatile memory. The information processing system writes read data into a memory region of the register corresponding to the same address as an address correlated with the read data acquired from the volatile memory. In the above-described way, the information processing system can synchronize the volatile memory with the register in the memory regions corresponding to the same address.

According to a fifth aspect of the present invention, there is provided an information processing method executed by an information processing system including a CPU, a selector configured by hardware and configured to determine such that an output destination of data input from the CPU is determined according to an address, a writing instruction signal, and a reading instruction signal, a volatile memory, and a register having the same address as an address of a memory region of the volatile memory storing initial setting data for a non-standard device including a register, the information processing method including the steps of: causing the CPU to output the address and the writing instruction signal instructing to write data to the address or the reading instruction signal instructing to read data from the address, to the selector; and causing the volatile memory to store data including snapshot image information and the initial setting data when the information processing system is started, on the basis of a signal output from the selector.

In the information processing method executed by the information processing system, in a case where data is read from an address common to both of the volatile memory and the register, the information processing system acquires write data from the register. In the information processing method executed by the information processing system, read data is written into a memory region of the volatile memory corresponding to the same address as an address correlated with the read data acquired from the register. In the above-described way, In the information processing method executed by the information processing system, the volatile memory can be synchronized with the register in the memory regions corresponding to the same address.

Advantageous Effects of Invention

According to the information processing system and the information processing method according to the embodiment of the present invention, it is possible to immediately initialize a peripheral device including a register when the information processing system is started.

DESCRIPTION OF EMBODIMENTS

Embodiments (Configuration of Information Processing System)

Hereinafter, a description will be made of a configuration of an information processing system according to an embodiment of the present invention.

Figure 1:
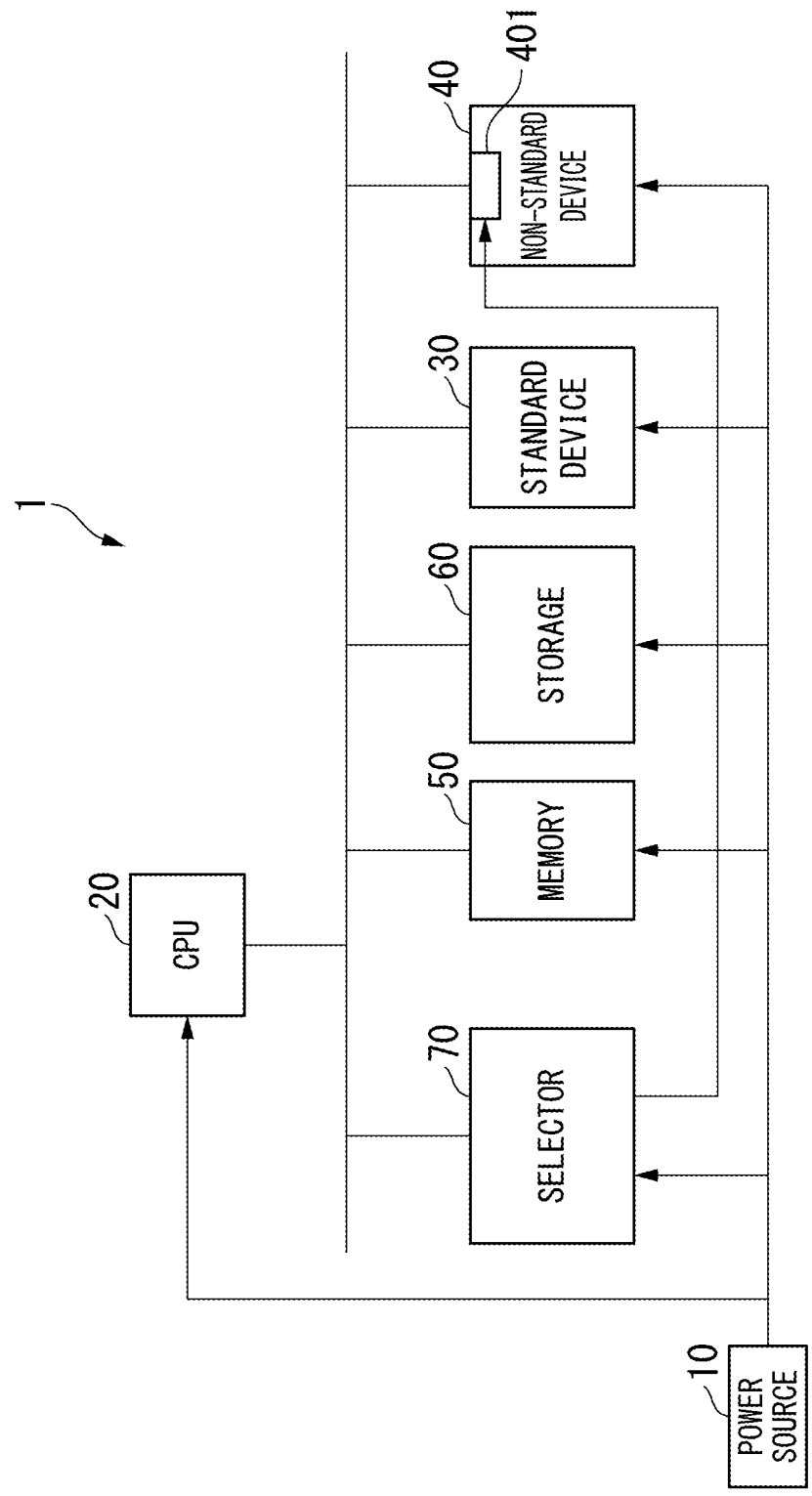
FIG. 1 is a first diagram for describing a configuration of an information processing system according to an embodiment of the present invention.

As shown in FIG. 1, an information processing system 1 according to the embodiment of the present invention includes a power source 10, a central processing unit (CPU) 20, a standard device 30, a non-standard device 40 (an example of a peripheral device including a register), a memory 50 (an example of a volatile memory), a storage 60, and a selector 70.

The information processing system 1 is a system that secures a memory region having the same address one-to-one corresponding to address of a register included in the non-standard device 40 in the memory 50 in advance, and synchronizes data in the memory region. Consequently, the information processing system 1 can initialize a peripheral device including a register at the substantially same timing as a timing at which a peripheral device is initialized as a result of data including snapshot image information and initial setting data for the non-standard device 40 being written into a main memory even when the information processing system 1 is started. The snapshot image information is data indicating a predetermined state such as a state right before the information processing system 1 is stopped or a factory default state, stored in a nonvolatile memory. The initialization is set each peripheral device to an operational state. Fast starting indicates that the information processing system 1 is initiated to be started, and the information processing system 1 is started in a predetermined state such as a factory default state or a state right before a power source of an apparatus is turned off as a result of data including the snapshot image information being written into a main memory. The information processing system 1 is started fast to initialize a peripheral device including a register, and thus a user can initiate to use the information processing system 1 from the predetermined state right after the information processing system is started.

As shown in FIG. 1, the power source 10 supplies power to each of the CPU 20, the standard device 30, the non-standard device 40, the memory 50, the storage 60, and the selector 70.

The standard device 30 is a peripheral device that is initialized as a result of data including snapshot image information being written into a main memory. The data including the snapshot image information is written into the memory 50 by a bootloader when the power source 10 is started in the information processing system 1, and thus the standard device 30 can be started fast in a predetermined state. The predetermined state is a state right before the information processing system 1 stops a process or a factory default state.

Figure 2:
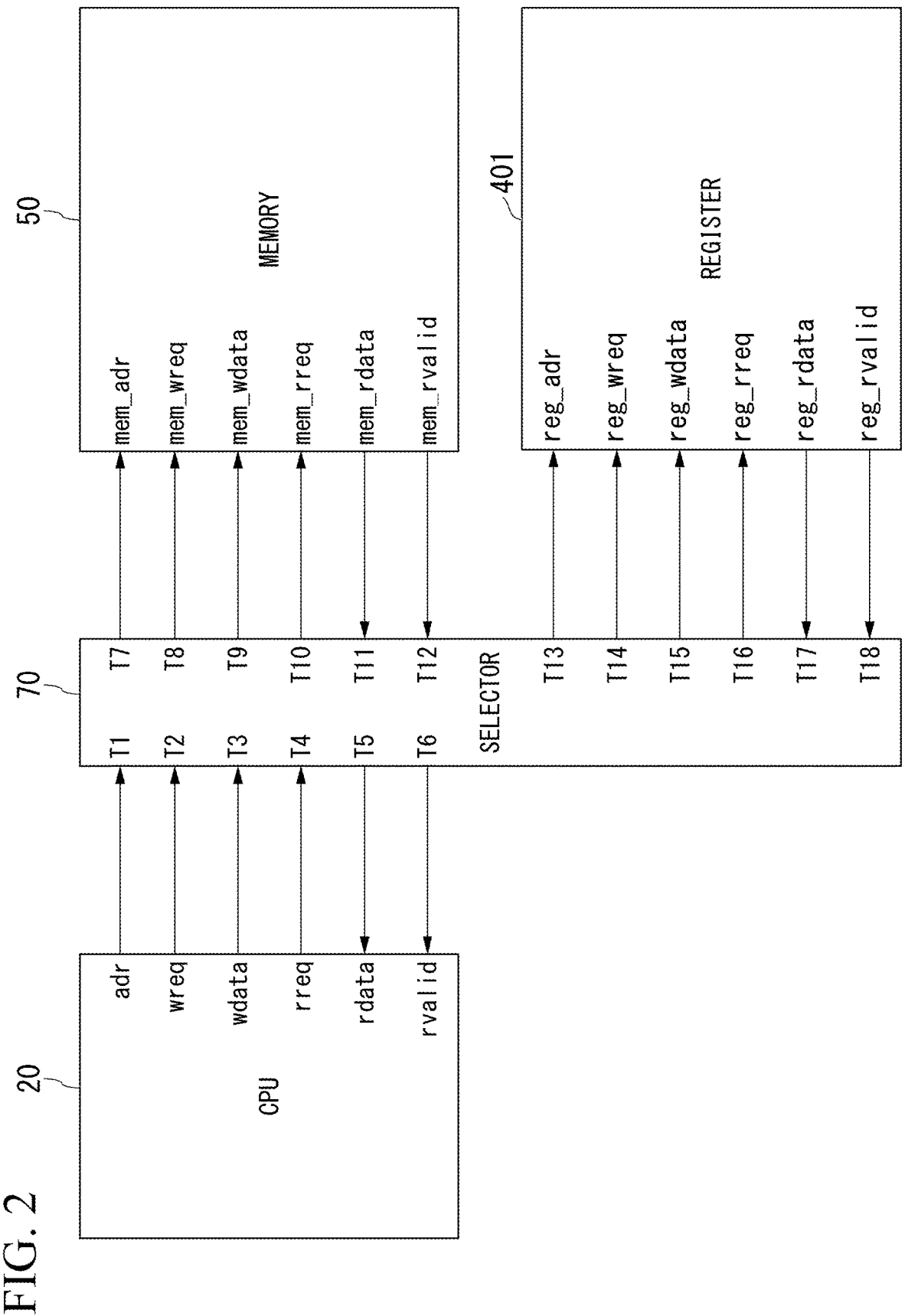
FIG. 2 is a second diagram for describing a configuration of the information processing system according to the embodiment of the present invention.

The non-standard device 40 is a peripheral device including a register. The non-standard device 40 is brought into an operational state as a result of initial setting data indicating initial setting being written into the register. As shown in FIG. 1, the non-standard device 40 includes a register 401. The register 401 is a register preserving the initial setting data. As shown in FIG. 2, the register 401 has a reg_adr terminal, a reg_wreq terminal, a reg_wdata terminal, a reg_rreq terminal, a reg_rdata terminal, and a reg_rvalid terminal. The reg_adr terminal is a terminal that receives an address at the time of reading or writing for the register 401 from the CPU 20. The reg_wreq terminal is a terminal that receives a signal instructing writing into the register 401 from the CPU 20. The reg_wdata terminal is a terminal that receives data to be written from the CPU 20 when the reg_wreq terminal receives a signal instructing writing. The reg_rreq terminal is a terminal that receives a signal instructing reading from the CPU 20. The reg_rdata terminal is a terminal that outputs read data to the CPU 20 when the reg_rreq terminal receives a signal instructing reading. The reg_rvalid terminal is a terminal that specifies data to be output (that is, data to be read) from the reg_rdata terminal.

The memory 50 is a main memory used for processing by the CPU 20. The memory 50 is a volatile memory. Data is transmitted and received at a high speed between the memory 50 and the CPU 20. When the information processing system 1 is started, the data including the snapshot image information stored in the storage 60 and initial setting data for the non-standard device 40 is written into the memory 50. The data including the snapshot image information and the initial setting data for the non-standard device 40 is written into the memory 50, and thus each of the CPU 20, the standard device 30, the non-standard device 40, the memory 50, and the storage 60 becomes operational. The data including the snapshot image information and the initial setting data for the non-standard device 40 includes command information indicating writing and information indicating an address of a writing destination. In the memory 50, the same address as an address of the register 401 included in the non-standard device 40 and a memory region corresponding to the address are secured in advance. As shown in FIG. 2, the memory 50 includes a mem_adr terminal, a mem_wreq terminal, a mem_wdata terminal, a mem_rreq terminal, a mem_rdata terminal, and a mem_rvalid terminal. The mem_adr terminal is a terminal that receives an address at the time of reading or writing for the memory 50 from the CPU 20. The mem_wreq terminal is a terminal that receives a signal instructing writing into the memory 50 from the CPU 20. The mem_wdata terminal is a terminal that receives data to be written from the CPU 20 when the mem_wreq terminal receives a signal instructing writing. The mem_rreq terminal is a terminal that receives a signal instructing reading from the CPU 20. The mem_rdata terminal is a terminal that outputs read data to the CPU 20 when the mem_rreq terminal receives a signal instructing reading. The mem_rvalid terminal is a terminal that specifies data to be output (that is, data to be read) from the mem_rdata terminal.

The storage 60 is a nonvolatile memory. The storage 60 stores the data including the snapshot image information and the initial setting data for the non-standard device 40 that are written into the memory 50 at the time of starting. The storage 60 stores an OS, an application program, data processed by the application program, and the like.

(Function of CPU 20)

The CPU 20 reads and writes data from and to at least one of the memory 50 or the register 401 via the selector 70. As shown in FIG. 2, the CPU 20 includes an adr terminal, a wreq terminal, a wdata terminal, an rreq terminal, an rdata terminal, and a rvalid terminal. The adr terminal is a terminal that outputs an address at the time of reading or writing for at least one of the memory 50 or the register 401. The wreq terminal is a terminal that outputs a signal instructing writing into at least one of the memory 50 or the register 401. The wdata terminal is a terminal that outputs data to be written when the wreq terminal outputs a signal instructing writing. The rreq terminal is a terminal that outputs a signal instructing reading to at least one of the memory 50 or the register 401. The rdata terminal is a terminal that receives read data when the rreq terminal outputs a signal instructing reading to at least one of the memory 50 or the register 401. The rvalid terminal is a terminal that specifies data (that is, read data) received from the rdata terminal.

(Configuration of Selector 70)

As shown in FIG. 2, the selector 70 is connected to each of the CPU 20, the memory 50, and the register 401. The selector 70 includes a T1 terminal, a T2 terminal, a T3 terminal, a T4 terminal, a T5 terminal, a T6 terminal, a T7 terminal, a T8 terminal, a T9 terminal, a T10 terminal, a T11 terminal, a T12 terminal, a T13 terminal, a T14 terminal, a T15 terminal, and a T16 terminal, a T17 terminal, and a T18 terminal. The T1 terminal is connected to the adr terminal. The T2 terminal is connected to the wreq terminal. The T3 terminal is connected to the wdata terminal. The T4 terminal is connected to the rreq terminal. The T5 terminal is connected to the rdata terminal. The T6 terminal is connected to the rvalid terminal. The T7 terminal is connected to the mem_adr terminal. The T8 terminal is connected to the mem_wreq terminal. The T9 terminal is connected to the mem_wdata. The T10 terminal is connected to the mem_rreq terminal. The T11 terminal is connected to the mem_rdata terminal. The T12 terminal is connected to the mem_rvalid terminal. The T13 terminal is connected to the reg_adr terminal. The T14 terminal is connected to the wreg terminal. The T15 terminal is connected to reg_wdata. The T16 terminal is connected to the reg_rreq terminal. The T17 terminal is connected to the reg_rdata terminal. The T18 terminal is connected to the reg_rvalid terminal.

The selector 70 is a circuit implemented by hardware in which a logic design is performed so as to output or receive signals to or from the appropriate T7 to T18 terminals in response to a signal that is input from the CPU 20.

Specifically, for example, in a case where the same address of the memory 50 and the register 401 is input to the T1 terminal and a signal instructing writing is input to the T2 terminal, the selector 70 outputs the address input to the T1 terminal from both the T7 terminal and the T13 terminal. The selector 70 outputs a signal input to the T2 terminal for instructing writing from both the T8 terminal and the T14 terminal. The selector 70 outputs data input to the T3 terminal to both the T9 terminal and the T15 terminal.

Specifically, for example, in a case where an address of only the memory 50 is input to the T1 terminal and a signal instructing writing is input to the T2 terminal, the selector 70 outputs the address input to the T1 terminal from the T7 terminal. The selector 70 outputs, from the T8 terminal, a signal input to the T2 terminal and instructing writing. The selector 70 outputs data input to the T3 terminal to the T9 terminal.

Specifically, for example, in a case where the same address of the memory 50 and the register 401 is input to the T1 terminal and a signal instructing reading is input to the T4 terminal, the address input to the T1 terminal is output from the T7 terminal and the T13 terminal. The signal instructing reading that is input to the T4 terminal is output from the T16 terminal. The T17 terminal is connected to the register 401 and acquires data. The T9 terminal outputs the data acquired at T17 to the memory 50. When data is output from the reg_rdata terminal, the register 401 outputs a "low level signal" for specifying the data to the selector 70 from the reg_rvalid terminal. The selector 70 outputs a signal instructing writing to the mem_wreg terminal from the T8 terminal in response to the "low level signal" for specifying the data received at the T18 terminal, and writes the data stored in the register 401 into the memory 50.

Specifically, for example, in a case where an address of only the memory 50 is input to the T1 terminal and a signal instructing reading is input to the T4 terminal, the signal input to the T4 terminal and indicating reading is output to the T10 terminal. The T11 terminal is connected to the memory 50 and acquires data. The T5 terminal outputs the data acquired at T11 terminal to the CPU 20. The CPU 20 determines, at the time of transmission, that data input to the T1 terminal is an address that only the memory 50 has. Therefore, the CPU 20 acquires the data from the T5 terminal and completes the reading of the data.

(Process Performed by Information Processing System 1)

Next, a description will be made of a process in the information processing system 1 according to the embodiment of the present invention.

Here, processes in the information processing system 1 in four cases shown in FIGS. 3(a) to 3(d) will be described.

(Writing of Data into Memory 50)

Figure 3:
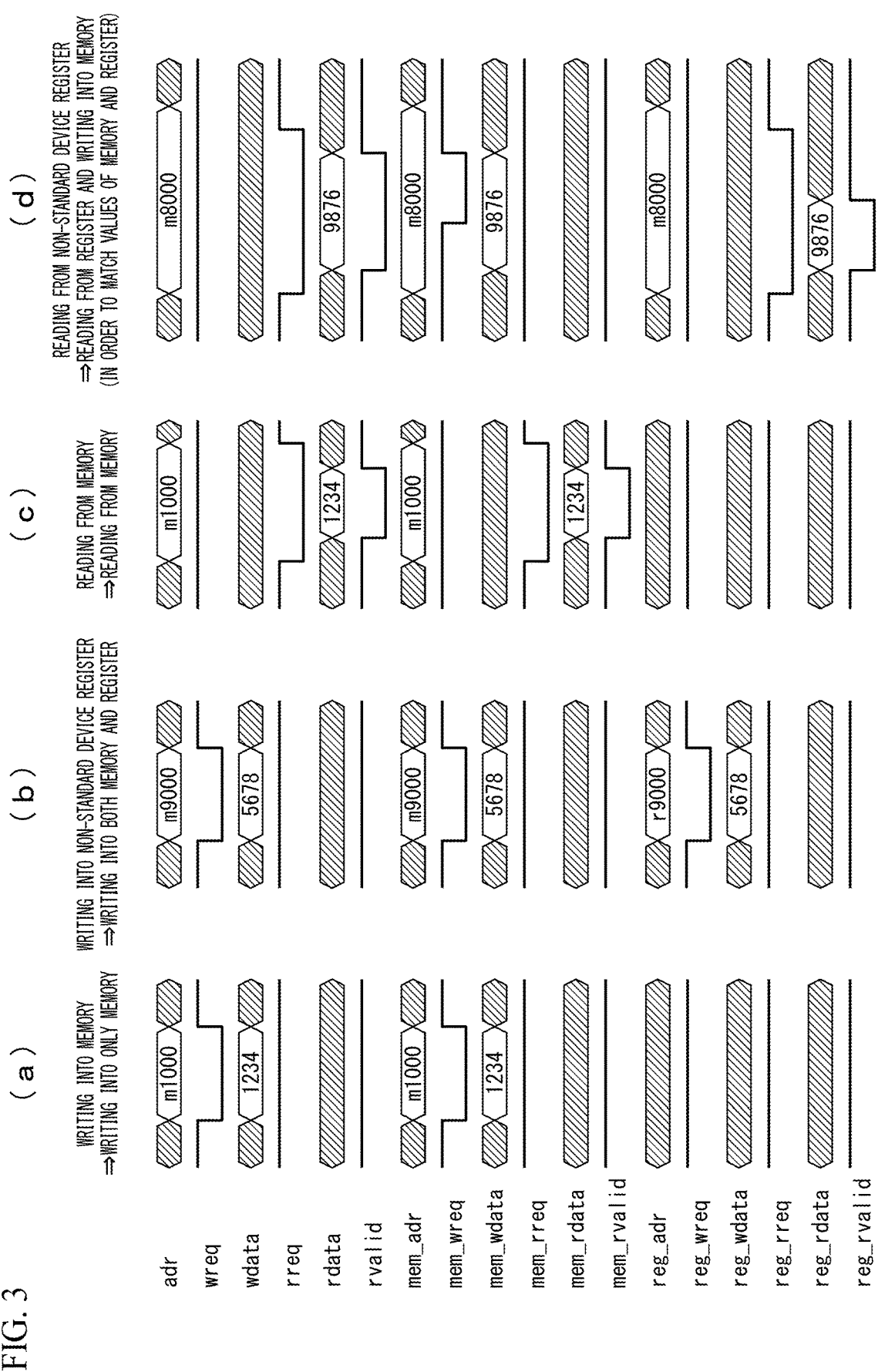
FIG. 3 is a diagram for describing a process of the information processing system according to the embodiment of the present invention.
Figure 4:
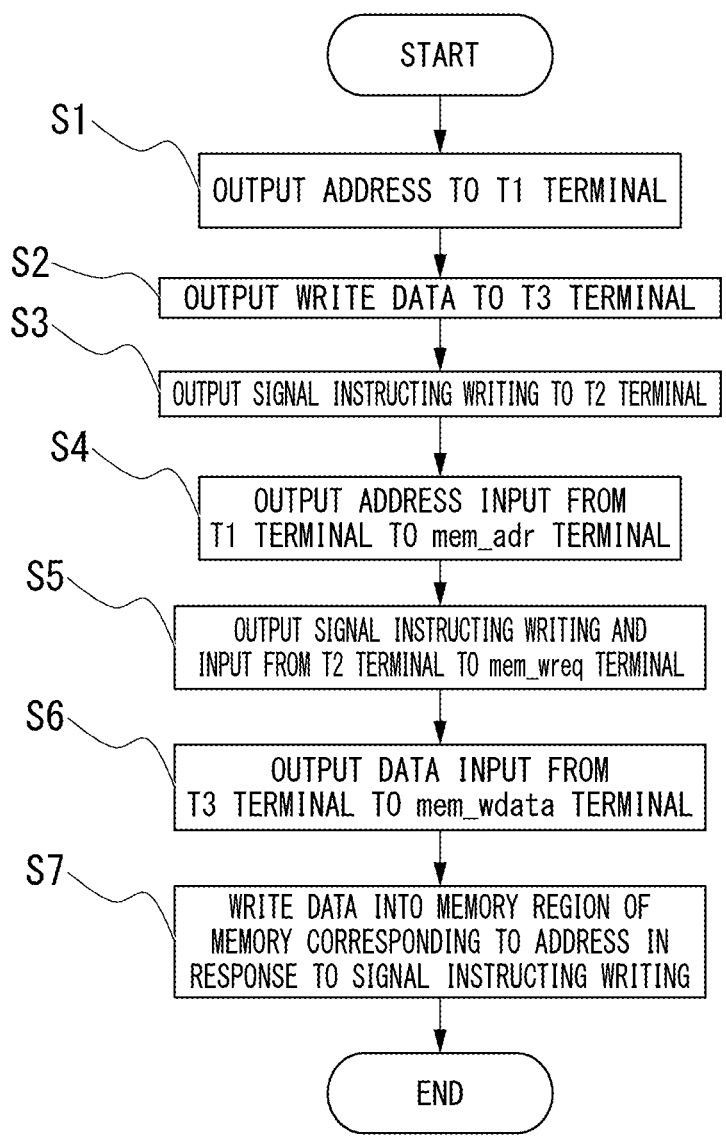
FIG. 4 is a first diagram showing a processing flow of the information processing system according to the embodiment of the present invention.

Writing of data into the memory 50 shown in FIG. 3(a), that is, writing of data "1234" into a memory region corresponding to an address of the memory 50 (for example, an address "m1000" shown in FIG. 3) that is different from an address of the register 401 will be described with reference to a processing flow shown in FIG. 4.

The CPU 20 outputs the address "m1000" to the T1 terminal from the adr terminal (step S1). The CPU 20 outputs the data "1234" to the T3 terminal from the wdata terminal (step S2). The CPU 20 outputs a "low level signal" instructing writing to the T2 terminal from the wreq terminal (that is, the signal instructing writing is asserted) (step S3). The CPU 20 performs the process in step S1 and the process in step S2 almost simultaneously, and outputs a signal instructing writing when signals of the address and the data are stabilized. Hereinafter, the processes of the CPU 20 outputting an address and data during writing are performed almost simultaneously even in a case where there is no particular description. The process of the CPU 20 outputting a signal instructing writing during the writing is performed when signals of the address and the data are stabilized.

The selector 70 outputs the address input from the T1 terminal, to the mem_adr terminal from the T7 terminal (step S4). The selector 70 outputs a signal instructing writing input from the T2 terminal, to the mem_wreq terminal from the T8 terminal (step S5). The selector 70 outputs data input from the T3 terminal, to the mem_wdata terminal from the T9 terminal (step S6).

The memory 50 receives, from the selector 70, the address "m1000", the "low level signal" instructing writing, and the data "1234". The memory 50 writes the data "1234" into the memory region corresponding to the address "m1000" in response to the signal instructing writing (step S7). The selector 70 is a circuit implemented by hardware as described above. Thus, in a case where the selector 70 receives an address, data, a signal instructing writing, a signal instructing reading, or the like from the CPU 20, the selector 70 completes a process almost simultaneously with reception of the signals, and outputs the processed signals from an appropriate terminal. Hereinafter, even in a case where there is no particular description, the selector 70 completes a process almost simultaneously with reception of an input signal, and outputs the processed signal from an appropriate terminal.

(Writing of Data into Register 401)

Figure 5:
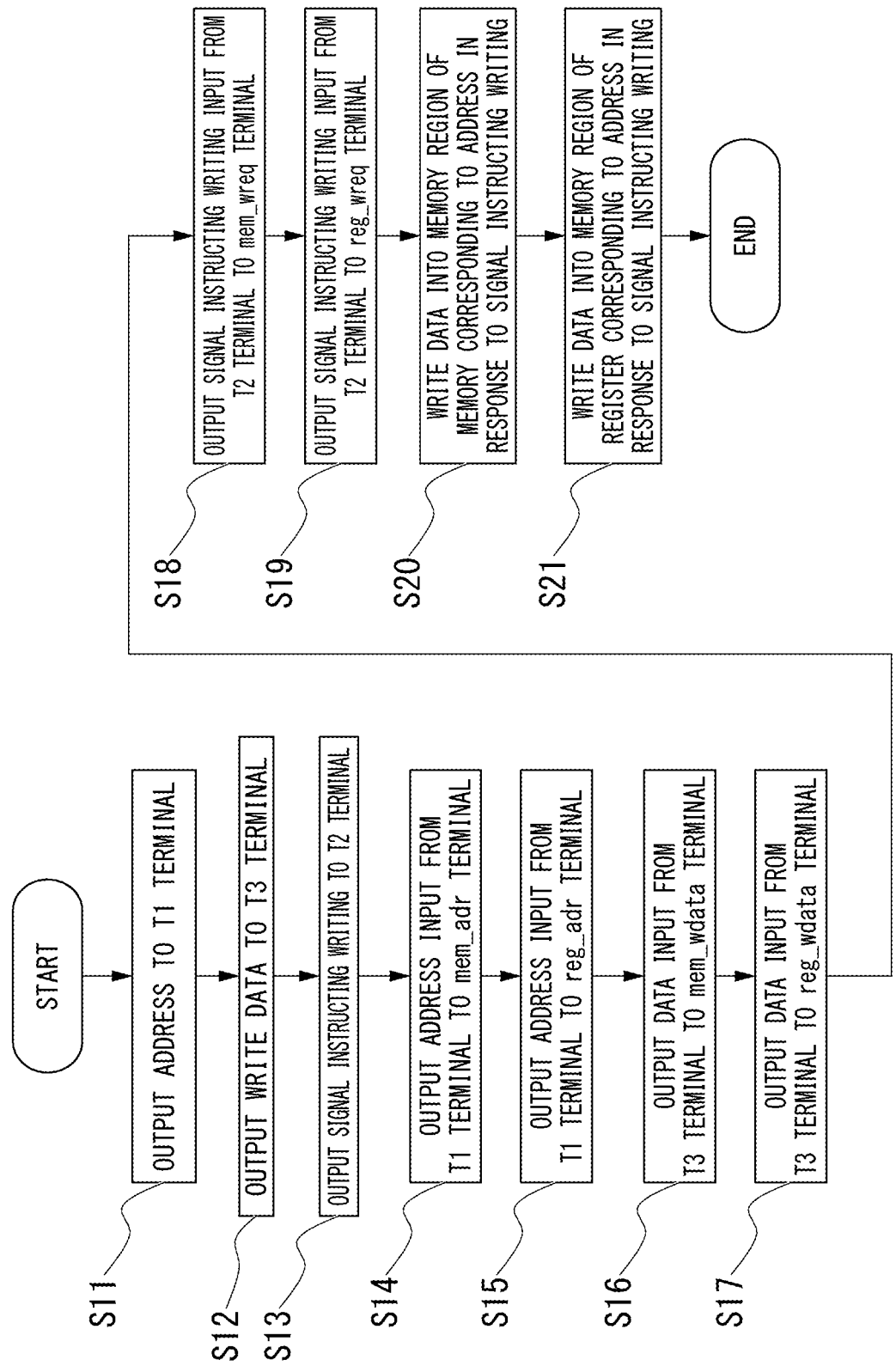
FIG. 5 is a second diagram showing the processing flow of the information processing system according to the embodiment of the present invention.

Writing of data into the register 401 shown in FIG. 3(b), that is, writing of data "5678" into a memory region corresponding to the same address (for example, an address "m9000" shown in FIG. 3) of the memory 50 as an address of the register 401 will be described with reference to a processing flow shown in FIG. 5.

The CPU 20 outputs the address "m9000" to the T1 terminal from the adr terminal (step S11). The CPU 20 outputs the data "5678" to the T3 terminal from the wdata terminal (step S12). Then, the CPU 20 outputs a "low level signal" instructing writing to the T2 terminal from the wreq terminal (step S13).

The selector 70 outputs the address input from the T1 terminal, to the mem_adr terminal from the T7 terminal (step S14). The selector 70 outputs the address input from the T1 terminal, to the reg_adr terminal from the T13 terminal (step S15). The selector 70 outputs the data input from the T3 terminal, to the mem_wdata terminal from the T9 terminal (step S16). The selector 70 outputs the data input from the T3 terminal, to the reg_wdata terminal from the T15 terminal (step S17). The selector 70 outputs a signal instructing writing input from the T2 terminal, to the mem_wreq terminal from the T8 terminal (step S18). The selector 70 outputs the signal instructing writing input from the T2 terminal, to the reg_wreq terminal from the T14 terminal (step S19). The processes in steps S14 and S15, S16 and S17, and S18 and S19 performed by the selector 70 are performed in parallel.

The memory 50 receives the address "m9000", the "low level signal" instructing writing, and the data "5678" from the selector 70. The memory 50 writes the data "5678" into the memory region corresponding to the address "m9000" in response to the signal instructing writing (step S20).

The register 401 receives, from the selector 70, the address "m9000", the "low level signal" instructing writing, and the data "5678". The register 401 writes the data "5678" into the memory region corresponding to the address "m9000" in response to the signal instructing writing (step S21).

When the information processing system 1 is started, the information processing system 1 performs a process of writing the data including the snapshot image information and the initial setting data for the non-standard device 40 stored in the storage 60 into the same address of the memory 50 as an address of the register 401. In the above-described way, when the information processing system 1 is started, the snapshot image information and the initial setting data for the register 401 are written into the memory 50, and, simultaneously, the initial setting data is written into the register 401. Therefore, the snapshot image information is written into the memory 50 and the standard device 30 is brought into an operational state, and, almost simultaneously, the non-standard device 40 is brought into an operational state.

(Reading of Data from Memory 50)

Figure 6:
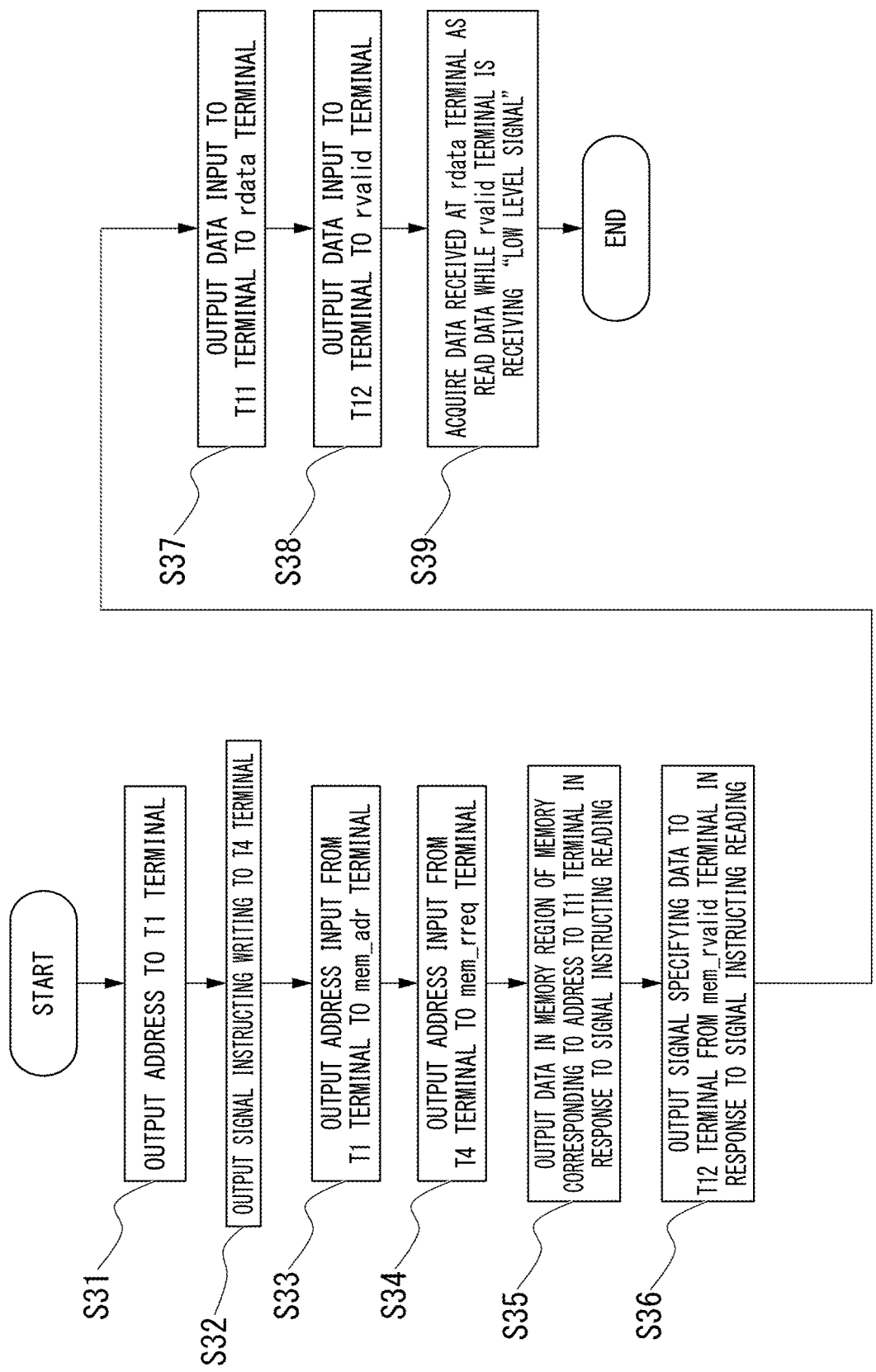
FIG. 6 is a third diagram showing the processing flow of the information processing system according to the embodiment of the present invention.

Reading of data from the memory 50 shown in FIG. 3(c), that is, reading of data "1234" from a memory region corresponding to an address (for example, the address "m1000" shown in FIG. 3) of the memory 50 that is different from an address of the register 401 will be described with reference to a processing flow shown in FIG. 6.

The CPU 20 outputs the address "m1000" to the T1 terminal from the adr terminal (step S31). Further, the CPU 20 outputs a "low level signal" instructing reading to the T4 terminal from the rreq terminal (that is, the signal instructing reading is asserted) (step S32).

The selector 70 outputs the address input from the T1 terminal, to the mem_adr terminal from the T7 terminal (step S33). Further, the selector 70 outputs a "low level signal" instructing reading input from the T4 terminal, to the mem_rreq terminal from the T10 terminal (step S34).

The memory 50 receives the address "m1000" and the "low level signal" instructing reading from the selector 70. The memory 50 outputs the data "1234" in the memory region corresponding to the address "m1000" to the terminal 11 from the mem_rdata terminal in response to the "low level signal" instructing reading (step S35). The memory 50 outputs a "low level signal" specifying the data "1234" to the T12 terminal from the mem_rvalid terminal in response to the "low level signal" instructinginging reading (step S36).

The selector 70 outputs the data input to the terminal 11, to the rdata terminal from the T5 terminal (step S37). The selector 70 outputs a "low level signal" specifying the data input to the T12 terminal, to the rvalid terminal from the T6 terminal (step S38).

The CPU 20 acquires the data "1234" received at the rdata terminal as read data while the rvalid terminal is receiving the "low level signal" (step S39).

(Reading of Data from Register 401)

Figure 7:
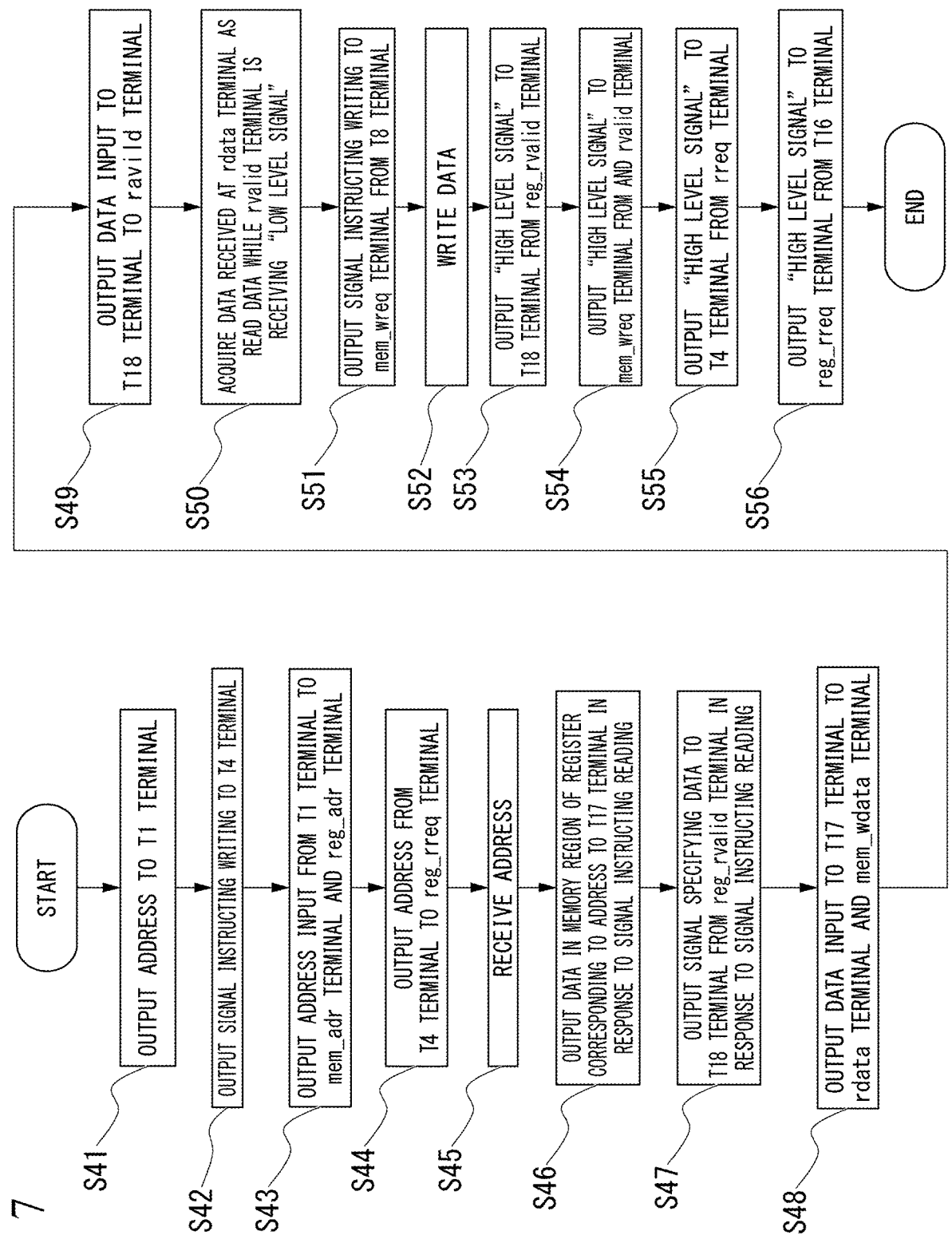
FIG. 7 is a fourth diagram showing the processing flow of the information processing system according to the embodiment of the present invention.

Reading of data from the register 401 shown in FIG. 3(d), that is, reading of data "9876" from a memory region corresponding to an address (for example, the address "m8000" shown in FIG. 3) of the register 401 where the same address is present in the memory 50 will be described with reference to a processing flow shown in FIG. 7.

The CPU 20 outputs the address "m8000" to the T1 terminal from the adr terminal (step S41). The CPU 20 outputs a "low level signal" instructing reading to the T4 terminal from the rreq terminal (that is, the signal instructing reading is asserted) (step S42).

The selector 70 outputs the address input from the T1 terminal, to the mem_adr terminal from the T7 terminal and to the reg_adr terminal from the T13 terminal (step S43). The selector 70 outputs a signal instructing reading from the T4 terminal, to the reg_rreq terminal from the T16 terminal (step S44).

The register 401 receives the address "m8000" and the "low level signal" instructing reading from the selector 70. In this case, the memory 50 receives the address "m8000" from the selector 70 (step S45). The register 401 outputs the data "9876" in the memory region corresponding to the address "m8000" to the terminal 17 from the reg_rdata terminal in response to the signal instructing reading (step S46). The register 401 outputs a "low level signal" specifying the data "9876" to the T18 terminal from the reg_rvalid terminal in response to the signal instructing reading (step S47).

The selector 70 outputs the data input to the terminal 17, to the rdata terminal from the T5 terminal and to the mem_wdata terminal from the T9 terminal (step S48). The selector 70 outputs the "low level signal" specifying the data input to the T18 terminal, to the rvalid terminal from the T6 terminal (step S49).

The CPU 20 acquires the data "9876" received at the rdata terminal as read data while the rvalid terminal is receiving the "low level signal" (step S50).

In a case where the "low level signal" is output to the rvalid terminal from the T6 terminal, the selector 70 outputs a signal instructing writing to the mem_wreq terminal from the T8 terminal (step S51).

The memory 50 receives the "low level signal" instructing writing. The memory 50 writes the data "9876" into the memory region corresponding to the address "m8000" received from the selector 70 in response to the signal instructing writing (step S52).

In a case where transmission of the data "9876" is completed, the register 401 outputs a "high level signal" to the T18 terminal from the reg_rvalid terminal (step S53). In other words, when the register 401 outputs the "high level signal" from the reg_rvalid terminal, data transmission is completed. Therefore, in a stage in which the register 401 outputs the "high level signal" from the reg_rvalid terminal through the process in step S49, the data read from the register 401 is transmitted to the memory 50, and is set as written data in the memory 50. Through the process in step S51, the process performed by the register 401 is finished in the process of reading data from the register 401. In the process of reading data from the register 401, in a case where the register 401 finishes the process, the data output from the reg_rdata by the register 401 has an undefined value.

In a case where the T18 terminal receives a "high level signal", the selector 70 outputs the "high level signal" to the mem_wreq terminal from the T8 terminal and to the rvalid terminal from the T6 terminal (step S54). Through the process in step S54 performed by the selector 70, the process of writing data into the memory 50 for data synchronization with the register 401 in the process of reading data from the register 401 is finished. In the process of reading data from the register 401, in a case where the memory 50 finishes the process, the data input to the mem_wdata terminal of the memory 50 has an undefined value. In a case where the CPU 20 receives the "high level signal" at the rvalid terminal, the CPU 20 finishes the process of reading data from the register 401. In the process of reading data from the register 401, in a case where the CPU 20 finishes the process of reading data from the register 401, the data input to the rdata terminal of the CPU 20 has an undefined value. In a case where the process of reading data from the register 401 is finished, the CPU 20 outputs a "high level signal" to the T4 terminal from the rreq terminal (step S55).

In a case where the "high level signal" is received at the T4 terminal, the selector 70 outputs the "high level signal" to the reg_rreq terminal from the T16 terminal (step S56). The process of reading data from the register 401 performed by the information processing system 1 is finished through the process in step S56. In a case where the process of reading data from the register 401 performed by the information processing system 1 is finished, an address output from the adr terminal of the CPU 20 is undefined, addresses input to the reg_adr terminal and the mem_adr terminal are also undefined, and thus all addresses are become open.

(Advantageous Effects)

As mentioned above, the information processing system 1 according to the embodiment of the present invention has been described.

In the information processing system 1 according to one embodiment of the present invention, the CPU 20 outputs an address and a writing instruction signal instructing to write data to the address or a reading instruction signal instructing to read data from the address, to the selector 70. The selector 70 is configured by hardware such that an output destination of data input from the CPU 20 is determined according to the address, the writing instruction signal, and the reading instruction signal. The memory 50 stores data including the snapshot image information and the initial setting data for the non-standard device 40 including the register 401 when the information processing system 1 is started, on the basis of a signal output from the selector 70. The register 401 has the same address as an address of a memory region of the memory 50 storing the initial setting data.

When the information processing system 1 is started, the information processing system 1 performs a process of writing the data including the snapshot image information and the initial setting data for the non-standard device 40 including the register 401 into a memory region corresponding to the same address of the memory 50 as an address of the register 401. In the above-described way, when the information processing system 1 is started, the snapshot image information is reproduced in the memory 50, and, simultaneously, the initial setting data is written into the register 401. Therefore, the snapshot image information is written into the memory 50 and the standard device 30 is brought into an operational state, and, almost simultaneously, the non-standard device 40 is brought into an operational state.

As described above, when the information processing system 1 is started, the information processing system 1 can immediately initialize the non-standard device 40 including the register 401.

(Modification Example)

In the information processing system 1 according to another embodiment of the present invention, it has been described that the register 401 can perform both writing and reading. However, some registers 401 can perform only writing.

In a case where the register 401 can perform only writing, the register 401 and the memory 50 are replaced with each other in the above (Reading of data from register 401), and a process of reading data from the memory 50 and writing the read data into the register 401 is performed in the same manner as the process in the above (Reading of data from register 401), and thus the data in the memory 50 and the register 401 can be synchronized. Further, the CPU 20 can read data to be stored in the register 401 from the memory 50.

Regarding the process in the embodiment of the present invention, an order of the process may be changed as long as an appropriate process is performed.

Each of storage units including the memory, the storage, and the register, and other storage devices in the embodiment of the present invention may be provided at any location as long as appropriate transmission and reception of information are performed. Each of storage units and other storage devices may be provided in a plurality and may store data in a distributed manner as long as appropriate transmission and reception of information are performed.

Although the embodiment of the present invention has been described, the above-described standard device 30, non-standard device 40, and other control devices may be provided with a computer system therein. The processing procedures are stored on a computer readable recording medium in the form of a program, and the processes are performed by a computer reading and executing the program. A specific example of the computer will be described below.

Figure 8:
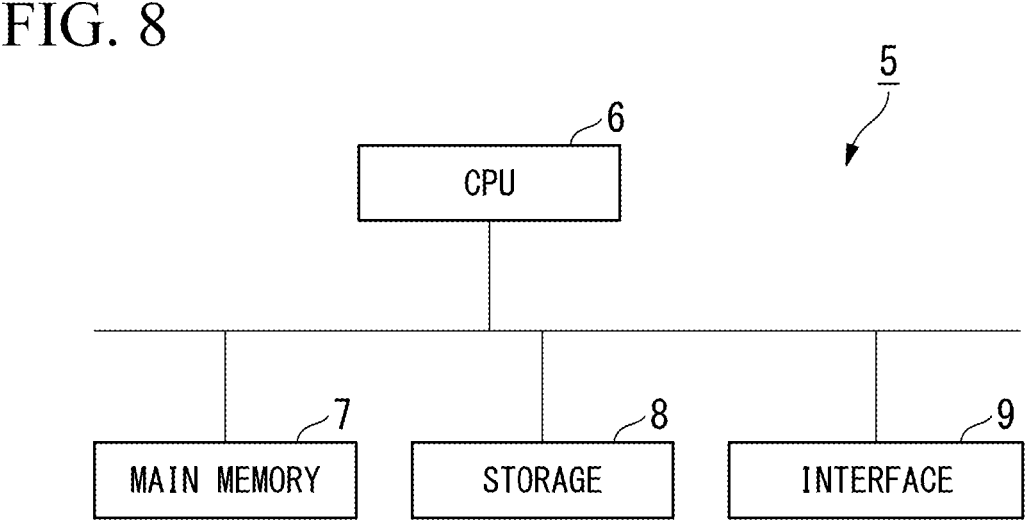
FIG. 8 is a schematic block diagram showing a configuration of a computer according to at least one embodiment.

FIG. 8 is a schematic block diagram showing a configuration of a computer according to at least one embodiment.

As shown in FIG. 8, a computer 5 includes a CPU 6, a main memory 7, a storage 8, and an interface 9.

For example, each of the above-described standard device 30, the non-standard device 40, and other control devices is mounted on the computer 5. An operation of each of the processing units is stored in the storage 8 in the form of a program. The CPU 6 reads the program from the storage 8, develops the program onto the main memory 7, and executes the process according to the program. The CPU 6 secures a memory region corresponding to each of the storage units in the main memory 7 according to the program.

Examples of the storage 8 may include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 8 may be an internal medium directly connected to a bus of the computer 5, and may be an external medium connected to the computer 5 via the interface 9 or a communication line. In a case where the program is delivered to the computer 5 via a communication line, the computer 5 having delivered the program may develop the program onto the main memory 7 so as to execute the processes. In at least one embodiment, the storage 8 is a non-transitory type storage medium.

The program may realize some of the functions. The program may be a file, a so-called difference file (difference program) that can realize the functions in combination with a program that has already been recorded on a computer system.

Some embodiments of the present invention have been described, but the embodiments are only examples and do not limit the scope of the present invention. The embodiments may be variously added, omitted, replaced, and changed within the scope without departing from the spirit of the invention.

INDUSTRIAL APPLICABILITY

The information processing system according to the embodiment of the present invention can immediately initialize a peripheral device including a register when the information processing system is started.

REFERENCE SIGNS LIST

1 Information processing system
6, 20, CPU
7 Main memory
8 Storage
9 Interface
10 Power source
30 Standard device
40 Non-standard device
50 Memory
60 Storage
70 Selector
401 Register

What is claimed is:

1. An information processing system comprising:
a central processing unit CPU that is configured to output an address and a writing instruction signal instructing to write data to the address or a reading instruction signal instructing to read data from the address, to a selector,
wherein the selector is configured by hardware and configured to determine such that an output destination of data input from the CPU is determined according to the address, the writing instruction signal, and the reading instruction signal; and
a volatile memory that is configured to store data including snapshot image information and initial setting data for a non-standard device including a register when the information processing system is started, on the basis of a signal output from the selector,
wherein the register has the same address as an address of a memory region of the volatile memory storing the initial setting data, and
wherein, in a case where the same address that the volatile memory and the register have is input to the selector and the reading instruction signal is input to the selector, the selector outputs the same address to the register, acquires read data from the register, and outputs the writing instruction signal and the read data acquired from the register to the volatile memory.

2. An information processing system comprising:
a central processing unit CPU that is configured to output an address and a writing instruction signal instructing to write data to the address or a reading instruction signal instructing to read data from the address, to a selector,
wherein the selector is configured by hardware and configured to determine such that an output destination of data input from the CPU is determined according to the address, the writing instruction signal, and the reading instruction signal; and
a volatile memory that is configured to store data including snapshot image information and initial setting data for a non-standard device including a register when the information processing system is started, on the basis of a signal output from the selector,
wherein the register has the same address as an address of a memory region of the volatile memory storing the initial setting data; and
wherein, in a case where the same address that the volatile memory and the register have is input to the selector, and the reading instruction signal is input to the selector, the selector outputs the same address to the volatile memory, acquires read data from the volatile memory, and outputs the writing instruction signal and the read data acquired from the volatile memory to the register.

3. An information processing method executed by an information processing system including a CPU, a selector configured by hardware, the hardware being separate from the CPU, and configured to determine such that an output destination of data input from the CPU is determined according to an address, a writing instruction signal, and a reading instruction signal, a volatile memory, and a register having the same address as an address of a memory region of the volatile memory storing initial setting data for a non-standard device including a register, the information processing method comprising the steps of:
causing the CPU to output the address and the writing instruction signal instructing to write data to the address or the reading instruction signal instructing to read data from the address, to the selector;
causing the selector, in a case where the same address that the volatile memory and the register have is input to the selector and the reading instruction signal is input to the selector, to output the same address to the register, to acquire read data from the register, and to output the writing instruction signal and the read data acquired from the register to the volatile memory; and
causing the volatile memory to store data including snapshot image information and the initial setting data when the information processing system is started, on the basis of a signal output from the selector.

4. An information processing method executed by an information processing system including a CPU, a selector configured by hardware, the hardware being separate from the CPU, and configured to determine such that an output destination of data input from the CPU is determined according to an address, a writing instruction signal, and a reading instruction signal, a volatile memory, and a register having the same address as an address of a memory region of the volatile memory storing initial setting data for a non-standard device including a register, the information processing method comprising the steps of:
causing the CPU to output the address and the writing instruction signal instructing to write data to the address or the reading instruction signal instructing to read data from the address, to the selector;
causing the selector, in a case where the same address that the volatile memory and the register have is input to the selector, and the reading instruction signal is input to the selector, to output the same address to the memory, to acquire read data from the memory, and to output the writing instruction signal and the read data acquired from the memory to the register; and
causing the volatile memory to store data including snapshot image information and the initial setting data when the information processing system is started, on the basis of a signal output from the selector.

* * * * *